(12) United States Patent
Yu (10) Patent No.: US 9,392,055 B2
(45) Date of Patent: Jul. 12, 2016

(54) DATA SHARING METHOD AND SYSTEM

(75) Inventor: Yifan Yu, Beijing (CN)

(73) Assignee: FRANCE TELECOM, Paris (FR)

( * ) Notice: Subject to any disclaimer, the term of this patent is extended or adjusted under 35 U.S.C. 154(b) by 501 days.

(21) Appl. No.: 13/499,204

(22) PCT Filed: Sep. 23, 2010

(86) PCT No.: PCT/IB2010/002628
§ 371 (c)(1),
(2), (4) Date: Mar. 29, 2012

(87) PCT Pub. No.: WO2011/039640
PCT Pub. Date: Apr. 7, 2011

(65) Prior Publication Data
US 2012/0195320 A1    Aug. 2, 2012

(30) Foreign Application Priority Data

Sep. 30, 2009 (WO) ................ PCT/CN2009/074340

(51) Int. Cl.
*H04L 12/28* (2006.01)
*H04L 29/08* (2006.01)

(52) U.S. Cl.
CPC ........... *H04L 67/104* (2013.01); *H04L 67/1063* (2013.01)

(58) Field of Classification Search
None
See application file for complete search history.

(56) References Cited

U.S. PATENT DOCUMENTS

| 2002/0031107 | A1* | 3/2002 | Li .................. H04L 61/2015 370/338 |
| 2006/0288119 | A1* | 12/2006 | Kim et al. ..................... 709/238 |
| 2008/0005195 | A1* | 1/2008 | Li ................................. 707/203 |
| 2008/0281982 | A1 | 11/2008 | Yanagihara et al. |
| 2009/0119386 | A1 | 5/2009 | Busser et al. |
| 2010/0064008 | A1 | 3/2010 | Yan et al. |
| 2010/0174740 | A1* | 7/2010 | Ge ................................. 707/769 |
| 2012/0092997 | A1* | 4/2012 | Mihaly et al. ................. 370/237 |

FOREIGN PATENT DOCUMENTS

CN    101459619    *    6/2009    ............. H04L 12/18

OTHER PUBLICATIONS

International Search Report dated Mar. 21, 2011 for corresponding International Application No. PCT/IB2010/002628, filed Sep. 23, 2010.
International Preliminary Report on Patentability and Written Opinion dated Apr. 3, 2012 for corresponding International Application No. PCT/IB2010/002628, filed Sep. 23, 2010.

* cited by examiner

*Primary Examiner* — Jae Y Lee
*Assistant Examiner* — Thinh Tran
(74) *Attorney, Agent, or Firm* — David D. Brush; Westman, Champlin & Koehler, P.A.

(57) ABSTRACT

A method is provided for sharing data between a plurality of nodes in a communication network. The communication network includes a first sharing router and a second sharing router. The first sharing router and second sharing router each have a memory, the memory including a record table for storing at least one record, wherein each record includes at least a reference describing the data to share and, at least one of the data to share or the address of at least a data node associated with the data to share, so that a collecting node may further collect the data.

10 Claims, 5 Drawing Sheets

DATA SHARING METHOD AND SYSTEM

CROSS-REFERENCE TO RELATED APPLICATIONS

This application is a Section 371 National Stage Application of International Application No. PCT/IB2010/002628, filed Sep. 23, 2010, which is incorporated by reference in its entirety and published as WO 2011/039640 on Apr. 7, 2011, in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates in general to telecommunication services and more specifically to call services.

BACKGROUND OF THE DISCLOSURE

Two classes of solutions have been deployed for data sharing, like for example file sharing between user equipments in a communication network. One is the Publish/Subscribe system, whereas the other is the peer-to-peer network.

The Publish/Subscribe (pub/sub) system is one of the application-level key technologies concerning data dissemination among user equipments in a communication network. It involves a server called publisher and a client called subscriber. The publisher produces data in form of events, which are consumed by subscribers issuing subscriptions representing their interest in specific events.

A peer-to-peer (P2P) computer network uses diverse connectivity between users in a communication network and the cumulative bandwidth of network participants rather than conventional centralized resources where a relatively low number of servers provide the core value to a service or an application. P2P networks are typically used for connecting nodes via largely ad hoc connections. Recently, a new framework known as P4P (A Portal for Proactive Provider Participation in P2P) has been tested in some commercial network with the purpose to manage P2P applications.

The current developed P2P and pub/sub systems build and operate their overlay topology on top of the Internet infrastructure, in an independent mode with respect to the network level information. Actually, the current P2P systems and pub/sub system are inefficiently built and operated in the large scale Internet due to the fact that the routing of information in the application layer is unaware of the communication network in the lower layer, which is recognized as a serious drawback of the current approaches. The pub/sub system highly relies on the root node or central server of the system as the data is disseminated in the large scale network, which brings the problem of single-point of failure. As for the P2P systems, although some of them can avoid the single-point failure problem by organizing the network with Distributed Hash Table (DHT) technology, it is difficult to locate the intended data as the query for data searching is not explicit and as data on users are distributed among the users. Actually, most of the currently used P2P systems still rely on the central server to facilitate the data query. Therefore, P2P systems also encounter the problem of single-point of failure.

Another drawback of P2P systems is that the frequency and amount of data processing required on each user equipment acting as a peer node implies a fast exhaustion of the battery of the user equipment. It is therefore difficult to deploy P2P systems in communication network such as for example mobile communication networks.

Today there is no solution to efficiently share data that allows reducing battery consumption for user equipments and thus improving efficiency of such telecommunication systems.

Today there is a need for an data sharing solution that can be easily implemented on the existing communication infrastructures.

SUMMARY

It is an object of the present system to overcome disadvantages and/or make improvement over the prior art.

According to a first aspect of the invention there is provided a method of sharing data according to claim 1.

In an embodiment according to the invention, a first sharing router may, in a preliminary act, receive from a data node a record comprising at least a reference describing the data to share and, at least one of the data to share or the address of at least a data node associated with the data to share, and storing said record in the record table of the first sharing router.

In an embodiment according to the invention, the reference query message comprising a reference on the data to share is received from the collecting node and the reference reply message comprising the address of at least one data node is sent to the collecting node.

In an embodiment according to the invention, the collecting node communicates on a direct communication link with the first sharing router and via the first sharing router with the second sharing router.

In an embodiment according to the invention, the first and/or second sharing router may collect and store in their respective record table the data for which the number of reference query messages is above a given value.

In an embodiment according to the invention, the first and second sharing routers may exchange records of their respective record table.

In an embodiment according to the invention, the reference comprises the type and/or value of data to share.

In an embodiment according to the invention, the first sharing router is aware of the type of references that are stored in the second sharing router.

According to a second aspect of the invention there is provided a system according to claim 9.

According to a third aspect of the invention there is provided a readable computer program according to claim 10.

The method according to an embodiment of the invention may be computer implemented. The method may be implemented in software on a programmable apparatus. It may also be implemented solely in hardware or in software, or in a combination thereof.

An advantage of an embodiment of the invention is that the data search is performed using the network and not other user equipments. This allows firstly reducing the exchange of messages with other user equipments (in particular the data or reference query messages are not exchanged between user equipments) and thus preserving dramatically longer the battery of user equipments. This also allows data search when other user equipments are not connected to the network, which allows live data search and further retrieving of the data non-connected (at the time of the search) user equipments may have when they are connected again.

Another advantage of an embodiment of the invention is that the sharing router is directly accessible to the user equipments if it is comprised in an Access Point (AP) of the communication network.

Another advantage of an embodiment of the invention is that the exchange of messages may be performed using the Internet Protocol such as e.g. IPv6, which makes the system and method according to an embodiment of the invention easy to integrate in the existing infrastructures.

Another advantage of an embodiment of the invention is that the storing in the sharing router comprises two options; either references of data are stored in a memory or the data itself is stored in a memory, leaving hence the choice to user equipments to publish the reference(s) of the data or the data itself or to the sharing router to accept references or data for a given data (especially when it comes to intellectual property rights).

Another advantage of an embodiment of the invention is that the data search does not need a large number of messages proportional to the number of user equipments.

Another advantage of an embodiment of the invention is that the number of sharing routers may be increased to support more users. Especially, a small number of sharing routers will allow data search and share for many more user equipments.

Another advantage of an embodiment of the invention is that a sharing router is easy to integrate in the communication network and may co-exist with traditional routers.

Another advantage of an embodiment of the invention is that a sharing router comprised in a AP may facilitate the data search for users having the same preferences (like for example at a concert, or a festival, or a meeting etc. . . . ).

Another advantage of an embodiment of the invention is that the merging of references may increase efficiency in the data search as a list of addresses are link to one reference and as the address of the smallest metric may be used to share the data, increasing the sharing of data between closer user equipments.

BRIEF DESCRIPTION OF THE DRAWINGS

Embodiments of the present invention will now be described solely by way of example and only with reference to the accompanying drawings, where like parts are provided with corresponding reference numerals, and in which.

DETAILED DESCRIPTION OF ILLUSTRATIVE EMBODIMENTS

The following are descriptions of exemplary embodiments that when taken in conjunction with the drawings will demonstrate the above noted features and advantages, and introduce further ones.

In the following description, for purposes of explanation rather than limitation, specific details are set forth such as architecture, interfaces, techniques, devices etc. . . . , for illustration. However, it will be apparent to those of ordinary skill in the art that other embodiments that depart from these details would still be understood to be within the scope of the appended claims.

Moreover, for the purpose of clarity, detailed descriptions of well-known devices, systems, and methods are omitted so as not to obscure the description of the present system. Furthermore, routers, servers, nodes, gateways or other entities in a telecommunication network are not detailed as their implementation is beyond the scope of the present system and method.

The computer-readable medium and/or memory may be any recordable medium (e.g., RAM, ROM, removable memory, CD-ROM, hard drives, DVD, floppy disks or memory cards) or may be a transmission medium utilizing one or more of radio frequency (RF) coupling, Bluetooth coupling, infrared coupling, etc. Any medium known or developed that can store and/or transmit data suitable for use with a computer system may be used as the computer-readable medium and/or memory.

Moreover, the term "memory" should be construed broadly enough to encompass any data able to be read from or written to an address in the addressable space accessed by a processor. With this definition, data on a network is still within the memory of the first sharing router 50, for instance, because the first sharing router 50 may retrieve the data from the network for operation in accordance with the present system. For example, a portion of the memory as understood herein may reside as a portion of a data server or database.

The first sharing router 50 is capable of performing operations in response to incoming request for a first webpage, and responses with the requested first webpage from the data server, and executing instructions stored in its memory. The first sharing router 50 may be an application-specific or general-use integrated circuit(s). Further, the first sharing router 50 may be a dedicated router for performing in accordance with the present system or may be a general-purpose router wherein only one of many functions operates for performing in accordance with the present system. The first sharing router 50 may operate utilizing a program portion, multiple program segments, or may be a hardware device utilizing a dedicated or multi-purpose integrated circuit.

Obviously, readily discernible modifications and variations of the present sharing router are possible in light of the above teachings. It is therefore to be understood that within the scope of the appended claims, the present invention may be practiced otherwise than as specifically described herein. For example, while described in terms of hardware/software components interactively cooperating, it is contemplated that an embodiment of the invention described herein may be practiced entirely in software. The software may be embodied in a carrier such as magnetic or optical disks, or a radio frequency or audio frequency carrier wave.

Unless specified otherwise, the exemplary embodiment will be described hereafter in its application to a router of a communication network.

In addition, it should be expressly understood that the drawings are included for illustrative purposes and do not represent the scope of the present system.

Figure 1:
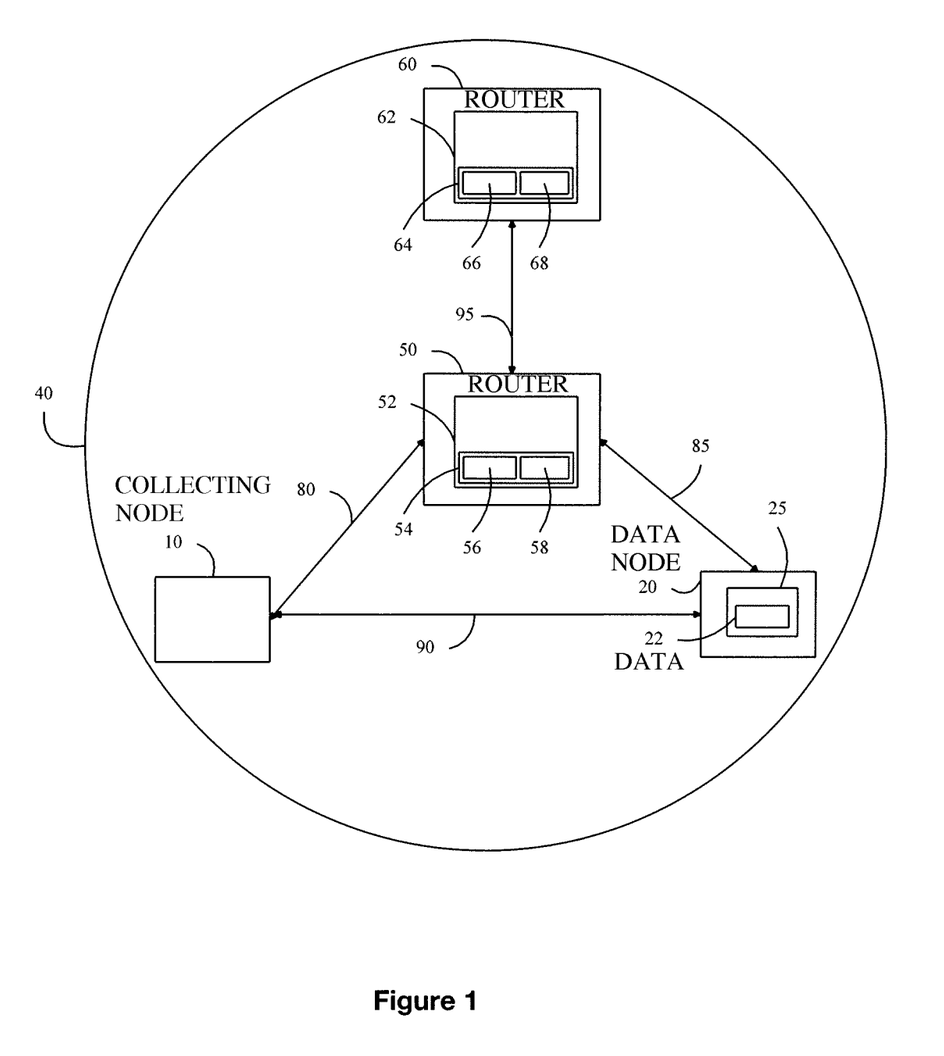
FIG. 1 schematically illustrates a system according to an embodiment of the present invention.

FIG. 1 describes the system according to an embodiment of the invention. The system according to an embodiment of the invention comprises a collecting node 10 who wishes to find a given piece of data 22 for further access, sharing or download. The piece of data may be for example a media content such as e.g. an audio file (such as for instance Moving Picture Experts Group layer 3 (MP3), Windows Media Audio (WMA) etc. . . . ) or a video file (such as for instance Moving Picture Experts Group 4 (MPEG-4), Audio Video Interleave (AVI), Windows Media Video (WMV) etc. . . . ) or any piece of data (text file, image file (such as for instance Joint Photographic Experts Group (JPEG), or else etc. . . . ). The data 22 may be therefore described or defined by a so called metadata. The metadata is a set of data about data 22 like for example if the data 22 is a video file, an audio file, a text file etc. . . . , or which is the title of data 22, or what category, or type of data it is, etc. . . .

The piece of data 22 is stored in a memory 25 of a data node 20. In order to locate the piece of data 22, the collecting node 10 needs to know the address of the data node 20. The address may be an Internet Protocol (IP) address, a URL, or any type of address. The system according to an embodiment of the invention comprises a sharing router 50 comprising a record table 52. The record table 52 allows storing records 54. A record 54 is a set of data classified into different categories. A record 54 comprises a reference 56 to a piece of data and at least one address 58 of the data node where said piece of data is stored. For example, a given record 54 may comprise the reference 58 of a piece of data 22 which is stored in the memory 25 of a data node 20, the address of which being the address 58. A given reference 56 may correspond to a plurality of addresses (58a, . . . , 58j etc. . . . ).

The collecting node 10, the sharing router 50 and the second user equipment 20 are able to communicate in a communication network 40. More precisely, the collecting node 10 is able to send, receive and/or exchange data or messages with the sharing router 50 on a first communication link 80. The data node 20 is able to send, receive and/or exchange data or messages with the sharing router 50 on a second communication link 85. The collecting node 10 is able to send, receive or exchange data or messages with data node 20 on a third communication link 90.

In the system according to an embodiment of the invention, a second sharing router 60 is able to communicate with the first sharing router 50 on a fourth communication link 95.

Figure 2:
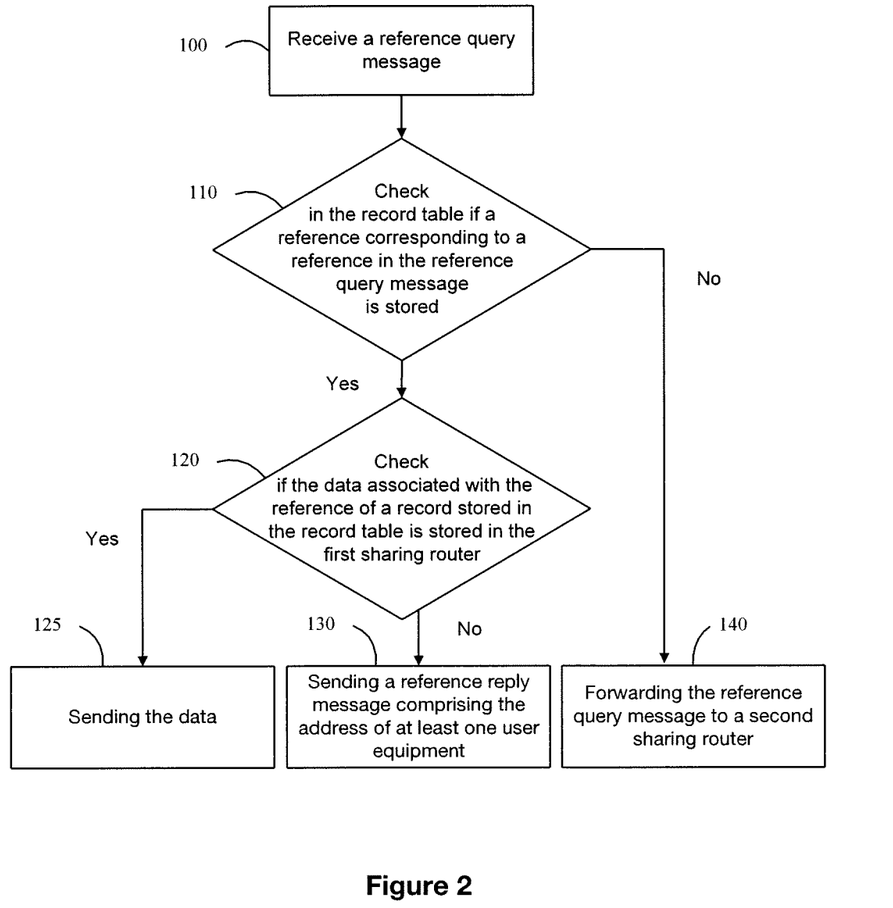
FIG. 2 schematically illustrates a method according to an embodiment of the present invention.

FIG. 2 describes the method according to an embodiment of the invention. The method according to an embodiment of the invention allows sharing data between a plurality of nodes in a communication network 40. The communication network 40 comprises a first sharing router 50 and a second sharing router 60. The first sharing router 50 and the second sharing router 60 each comprise a memory. Each of the memory of the first 50 and second 60 sharing router comprises a record table (respectively 52, 62) for storing at least one record (respectively 54, 64), wherein each record comprises at least a reference (respectively 56, 66) describing the data to share 22 and, at least one of the data to share 22 or the address (respectively 58, 68) of at least a data node 20 associated with the data to share 22, so that a collecting node 10 may further collect the data 22. The reference may be a part of a metadata of a data 22. A record may thus comprise part or all of one or more metadata of data, along with IP addresses and/or the data themselves.

In an act 100, the first sharing router 50 receives a reference query message comprising a first reference describing the data to share 22 and an address of a collecting node 10 bound to be the recipient of the data to share.

In an act 110, the first sharing router 50 checks if the first reference matches with a reference 56 of a first record 54 stored in the record table 52 of the first sharing router 50 (i.e. in its memory).

When finding that the first reference matches with a reference 56 of a first record 54 stored in the record table 52 of the first sharing router 50, the first sharing router 50 check, in act 120, if a first data 22 associated with said first reference 56 is stored in the memory of the first sharing router 50.

If the first data 22 is stored in the memory, the first sharing router 50 sends, in act 125, said first data 22 to the collecting node 10. The data 22 may be:

sent directly by the first sharing router 50 to the IP address of the first user equipment 10, or, sent subsequently to a negotiation protocol, wherein said negotiation protocol comprises sending of a delivery request message (as described hereunder in reference to FIG. 6) by the first sharing router 50 and receiving, by the first sharing router 50, a delivery response message (as described hereunder in reference to FIG. 7) from the first user equipment 10, or collected (i.e. downloaded) by the first user equipment 10 upon request of the first sharing router 50.

If the first data 22 is not stored in the memory, the first sharing router 50 sends, in act 130, a reference reply message. The reference reply message comprises the address 58 in the record table 52 of at least one data node 20 associated with the first data 22 so that said at least one data node 20 may further share the first data 22 with the collecting node 10.

When finding that the first reference does not match a reference (56) of a first record (54), the first sharing router 50 forwards, in act 140, the reference query message to the second sharing router (60). The second sharing router 60 may then check if the reference of the reference query message matches a reference 66 of a record 64 stored in the record table 62. If so, the second sharing router 60 may reply to the first sharing router 50 with the data or the address(es) (like e.g. IP address(es)) of data nodes 20 associated with the received reference. If not, the second sharing router 60 may forward to another router, like e.g. another sharing router (50, 60) in order to get the requested addresses or data 22.

The reference query message is received from the collecting node 10. The collecting node 10 may be a user equipment, a server or another router such as e.g. another sharing router (50, 60) or another equipment without limiting the scope of the present invention.

In the following description and for illustrative purposes, the method according to an embodiment of the invention will be described using a first user equipment 10 as collecting node 10 and a second (or more) user equipment 20 as data node 20. This is not limiting the scope of the present invention.

First and second user equipments (respectively 10 and 20) may further communicate to exchange the data 22. More precisely, the first user equipment 10 may contact the second user equipment 20 with a delivery request message (as described in reference to FIG. 6) using the address 58 received in the reference reply message. And the user equipment 20 may reply to the first user equipment 10 with a delivery response message (as described with reference to FIG. 7) to indicate if it accepts the connection and on which Transmission Control Protocol (TCP) port of the user equipment 20 the first user equipment may further connect to get the data 22.

According to an embodiment of the invention, the communication network 40 may be based on an Internet Protocol v6 (IPv6) wherein the first sharing router 50 may be an access router such as for example an Access Point (AP) router and wherein the second sharing router 60 may be a core network router. An AP router may be for instance a wireless access point. An AP router is directly accessible to user equipments whereas a core network router is not directly accessible to user equipments as it is located in the core network. An AP router and a core network router may be for example connected through Internet. Consequently, the AP router is on the border of the Internet network, whereas the core network router is in the core network of the Internet network. In other words, the AP router and the core network router are at two different levels where the AP is directly accessible by the user equipment and the core network router is not directly accessible by the user equipment but via the AP router.

In order to communicate with the first sharing router 50, user equipments (10, 20) may embed the messages they exchange in communication protocols such as e.g. Internet protocols like for example the Internet Protocol v4 (IPv4), Internet Protocol v6 (IPv6), Internet Protocol v9 (IPv9), etc. . . .

The user equipment 10 allows sending reference query messages and receiving reference reply messages. Reference query messages may be sent to the first sharing router 50 directly or via another gateway (such e.g. another traditional router etc. . . . ). Reference reply messages may be received from the first sharing router 50 directly or via another gateway (such e.g. another traditional router etc. . . . ).

The user equipment 20 allows sending messages comprising records that are to be stored in table records (52, 62).

The user equipment 10 and the user equipment 20 may further communicate in order to exchange or share the data 22 once the first user equipment 10 has received the address of the second user equipment 20.

In an alternative embodiment, the address of the first user equipment 10 may be collected then sent by the first sharing router 50 to the at least second user equipment 20 so that the second user equipment 20 may further send the data 22 to the first user equipment 10.

According to an embodiment of the invention, the Internet Protocol v6 (IPv6) may be used to communicate between user equipments (10, 20) and the first sharing router 50 and between the first sharing router 50 and the second sharing router 60. Indeed, as existing infrastructures of communication mostly rely on Internet Protocols, the use of, for instance IPv6, allows implementing an embodiment of the invention on the existing Internet Protocol infrastructures.

Figure 3:
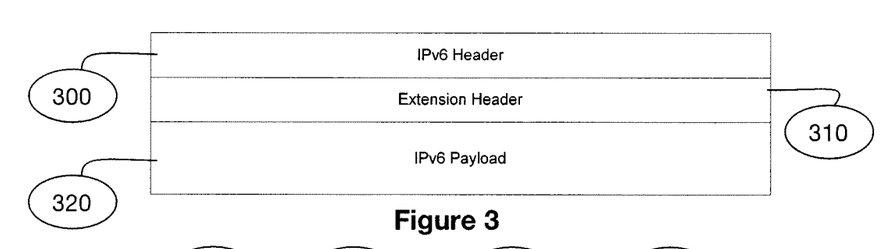
FIG. 3 schematically illustrates a generic message according to an embodiment of the present invention.

Consequently, using the format defined by IPv6 and as described in FIG. 3, different new header options may be defined in the extension header 310 of the IPv6 packets in order to embed messages to be exchanged in the method according to an embodiment of the invention. The field 300 and 320 are respectively the traditional IPv6 header and IPv6 payload.

In an embodiment of the invention, the set of messages that may be embedded in the IPv6 header options comprises:
a reference query message,
a reference reply message,
a delivery request message,
a delivery reply message, and,
a data publish message.

The reference query message is generated by the first user equipment 10 in order to request the data 22. A new header option is defined in the extension header field of an IPv6 packet to indicate the attributes of the query for data 22. Such attributes may be for instance the name, the type, the creation time, etc. . . . As described on FIG. 4, the new header may be formatted like a hop-by-hop extension header or like a destination extension header. The hop-by-hop extension header is an extension header defined in IPv6 that is processed by all the routers of the network. It may be thus used when the first user equipment 10 does not know the IP address of the first sharing router 50. The destination extension header is defined in IPv6. The destination extension header is processed by the destination router as its IP address is known. It may be thus used when the IP address of the first sharing router 50 is known from the first user equipment 10. Headers may be divided into sub-fields. Both hop-by-hop and destination headers have the same definition of their sub-fields.

Figure 4:
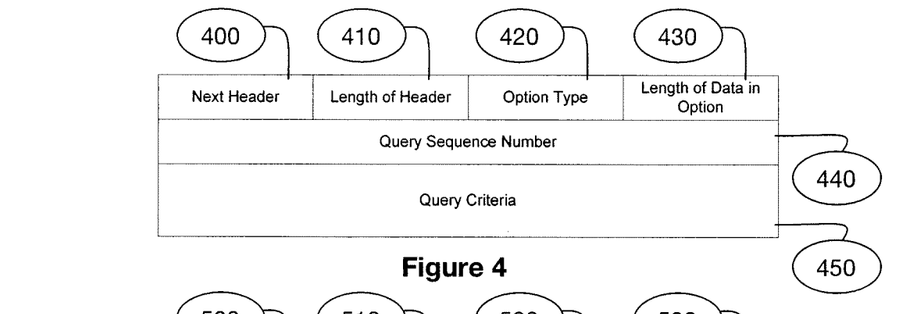
FIG. 4 schematically illustrates a reference query message according to an embodiment of the present invention.

When the first user equipment 10 or the user equipment 20 does not know the destination address of the first sharing router 50, an anycast address may be used. The anycast address may be set as the one destined to the nearest first sharing router 50. The hop limitation may be set in the reference query message with the anycast address to avoid traffic flooding. As the reference query message has the anycast address, it forwarded by traditional routers in the communication network 40 until it reaches the first sharing router 50 or until its hops limitation is reduced to zero. When the first user equipment 10 and the user equipment 20 know the destination address of the first sharing router 50, the reference query message sets its destination address as the address of the first sharing router.

There are two main sub-fields defined in the new header option for embedding the reference query message, namely, the query sequence number field 440 and the query criteria field 450. The query sequence number field 440 indicates the sequence number larger than zero that identifies uniquely the query generated by the first user equipment 10. The query criteria field 450 comprises the reference of the data 22 that the first user equipment 10 is looking for. For example, if the first user equipment 10 wishes to get the data 22 with the name of "movie" and size larger than "100 Kbytes", the query criteria field may be filled in with as "name=movie and size>100 Kbytes".

The first sharing router 50 identifies the reference query message by checking the type of header option. Upon reception of the reference query message, the first sharing router 50 reads the query criteria from the header option and searches records 54 in the record table 52 to check if at least one reference matches or corresponds to the query criteria of the reference query message in its record table 52. When the first sharing router 50 finds a matching reference in its record table 52, it checks first if the data 22 associated with the reference is stored in the first sharing router 50 (in the record table 50 or in a linked database). If the data 22 associated with the reference is stored in the first sharing router 50, the first user equipment will receive the data 22 (sent by the first sharing router 50 or collected by the first user equipment 10). If the data 22 associated with the reference is not stored in the first sharing router 50, the first sharing router 50 sends to the first user equipment 10 a reference reply message comprising a list of at least one IP address of a user equipment 20 that has or store the data 22.

When the first sharing router 50 does not find a matching reference in its record table 52, its may forward the reference query message to a second sharing router 60 as described hereunder.

Field 400 indicates the next header. Field 410 indicates the length of the header. Field 420 indicates the option type. The field of option type 420 indicates the specific type of the extension header in the IPv6 header. The Field 430 indicates the length of the data in option. Field 430 allows facilitating the processing of the extension header. As the length of data in option is given, the router is able to determine the end of the extension header, helping thus the router to correctly extract the data from the extension header.

Figure 5:
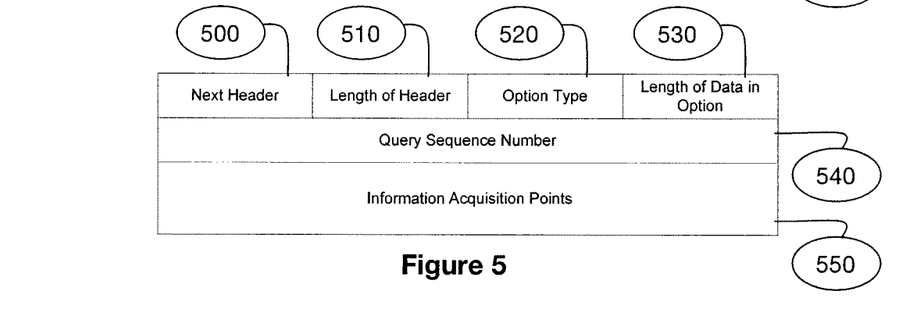
FIG. 5 schematically illustrates a reference reply message according to an embodiment of the present invention.

The reference reply message is used for replying to the reference query message. It is formatted as a destination extension header comprising the address of the first user equipment 10.

FIG. 5 describes an extension header defined for embedding a reference reply message. It comprises two main sub-fields: a query sequence number field 540, an data acquisition points field 550. The query sequence number field 540 indicates the sequence number larger than zero that identifies uniquely the query generated by the first user equipment 10. The value of sequence number field is therefore the same as that in the query sequence number 440 of the reference query message sent by the first user equipment 10. The data acquisition points field 550 indicates the at least one address of the at least one user equipment 20 having the requested (i.e. queried) data 22 and the identifier of the data 22 in the corresponding user equipment 20. Indeed, as more than one user equipment 20 may have the data 22, the identifier of the data 22 allows further retrieving the data 22 stored on a given user equipment, the data 22 being indexed in said given user equipment 20 with said identifier.

Field 500 indicates the next header. Field 510 indicates the length of the header. Field 520 indicates the option type. The field of option type 520 indicates the specific type of the extension header in the IPv6 header. The Field 530 indicates the length of the data in option. Field 530 allows facilitating the processing of the extension header. As the length of data in option is given, the router is able to determine the end of the extension header, helping thus the router to correctly extract the data from the extension header.

When the reference of the reference query message does not match a reference (56) of a record (54) stored in the record table (52), forwarding the reference query message to a second sharing router (60). In addition, the destination address of the reference query message is changed into the IP address of the second sharing 60 so that it is forwarded to. The header option of the reference query message is also changed into the type of destination option. Since the sub-fields in the header option with the format of hop-by-hop option are same as those defined in the header formatted as the destination option, there only needs to modify the value of the option type in the option field of the header. When the router cannot find the next hop (the next router) to forward the reference query message, it responds with the reference reply message packet comprising the IP address of 0000:0000:0000:0000:0000:0000:0000:0000 in the data acquisition point field.

Figure 6:
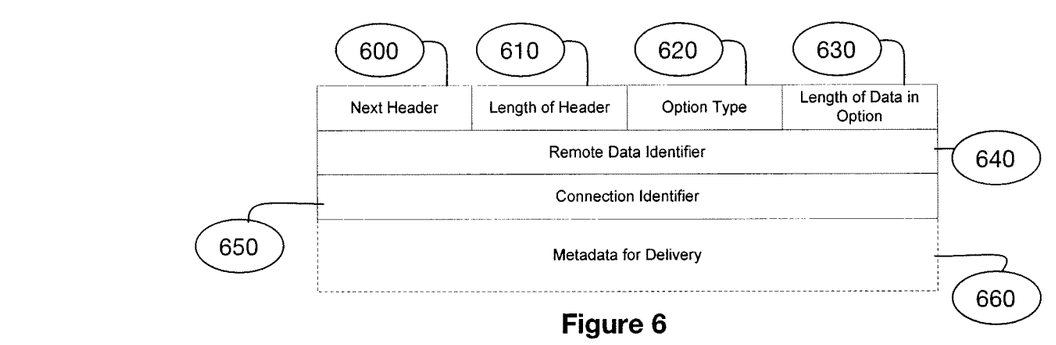
FIG. 6 schematically illustrates a delivery request message according to an embodiment of the present invention.

The delivery request message is sent out by the first user equipment 10, for example, after having received a reference reply message, in order to set up a connection with the at least one user equipment 20 to obtain the data 22. The packet is formatted as a destination extension header with the address of the user equipment 20.

FIG. 6 describes an extension header defined for embedding a delivery request message. There are main three sub-fields defined in the extension header for embedding the delivery request message:
- the remote data identifier 640,
- the connection identifier 650, and,
- the metadata for delivery 660.

The delivery request message may be sent by the first user equipment 10 to an identified user equipment 20 to request the data 22. In this case:
- the value of the remote data identifier 640 is greater than zero and corresponds to the identifier of the data 22 as stored in the user equipment 20,
- the connection identifier 650 allows uniquely identifying the delivery request message sent by the first user equipment 10.
- the length of the sub-field of metadata for delivery 660 is zero (i.e. there is no sub-field of metadata for delivery or the sub-field of metadata for delivery is empty or null).

The delivery request message may also be sent by a user equipment 20 to the first sharing router 50 to request the acknowledgement by the first sharing router 50 of the delivery of data 22 by the user equipment 20. In this case:
- the value of the remote data identifier 640 is set to zero and indicates that the user equipment 20 requests the acknowledgement by the first sharing router 50 of the delivery of data 22,
- the connection identifier 650 allows uniquely identifying the delivery request message sent by the user equipment 20,
- the sub-field of metadata for delivery 660 comprises the metadata associated with the data 22 that is requested to be further sent to the first sharing router 50. Such metadata may be, as explained above, the type or category of data, a title etc. . . .

Field 600 indicates the next header. Field 610 indicates the length of the header. Field 620 indicates the option type. The field of option type 620 indicates the specific type of the extension header in the IPv6 header. The Field 630 indicates the length of the data in option. Field 630 allows facilitating the processing of the extension header. As the length of data in option is given, the router is able to determine the end of the extension header, helping thus the router to correctly extract the data from the extension header.

As described hereabove, the delivery request packet may be used by the first user equipment 10 or a user equipment 20 or a first sharing router 50 or a second router 60 to request the set up of a connection for collecting or sending data. Therefore, for example, a user equipment 10 may send a delivery request packet to a user equipment 20 to further collect data from said user equipment 20, or a first sharing router 50 may send a delivery request packet to a second sharing router 60 or vice-versa to further collect data from said second sharing router 50 (or vice-versa), or a user equipment 20 may send a delivery request packet to a first sharing router 50 to further send data to said first sharing router 50.

For example, when the value of the field of remote data identifier is set to zero in a delivery request message sent by a user equipment 20 to a first sharing router 50, the first sharing router may create a buffer to further store the data received from the user equipment 20 and assign a local identifier to said buffer describing or characterizing the metadata comprised in the header option of the delivery request packet.

Figure 7:
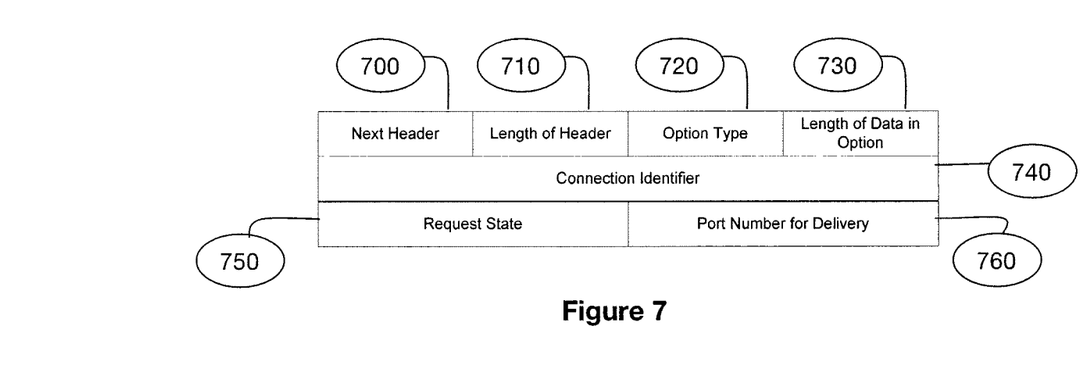
FIG. 7 schematically illustrates a delivery response message according to an embodiment of the present invention.

The delivery response packet is sent in response to the delivery request packet. Its header option is formatted as a destination extension header as the IP address of the sender of the delivery request packet is known. FIG. 7 describes an extension header defined for embedding a delivery response message. As described in FIG. 7, the header option has three main sub-fields:
- the connection identifier 740, which is used to identify the connection initiated by the sender of the delivery request packet. It is usually the replicate of the field of connection identifier 640 in the delivery request packet (in reference to FIG. 6), the request state 750 which allows indicating whether the connection setup request from the sender of the delivery request packet is accepted. If the value of the field is zero, the connection request is accepted, otherwise the connection request is rejected.

the port number for delivery 760. It is the Transmission Control Protocol (TCP) port that the receiver of the delivery request packet will use for delivering the data 22 if the connection request is accepted. When the connection request is rejected, the value of the field should be ignored.

In the case where the delivery request packet was sent by the first user equipment 10 to a user equipment 20, the user equipment 20 may indicate in the port number for delivery field the TCP port where the first user equipment 10 may connect to for collecting the data 22.

In the case where the delivery request packet was sent by a user equipment 20 to the first sharing router 50, the first sharing router 50 may indicate in the port number for delivery field the TCP port where the user equipment 20 may connect to for sending the data 22.

Field 700 indicates the next header. Field 710 indicates the length of the header. Field 720 indicates the option type. The field of option type 720 indicates the specific type of the extension header in the IPv6 header. The Field 730 indicates the length of the data in option. Field 730 allows facilitating the processing of the extension header. As the length of data in option is given, the router is able to determine the end of the extension header, helping thus the router to correctly extract the data from the extension header.

Figure 8:
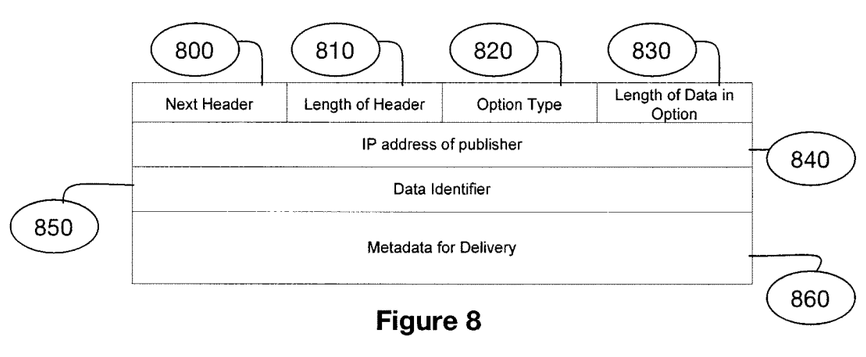
FIG. 8 schematically illustrates a data publish message according to an embodiment of the present invention.

The data publish message may be sent to the first sharing router 50 by a user equipment 20 that wishes to send or publish references on data stored in said user equipment 20. This allows the first sharing router 50 to complement or add these references as records in its record table 52 along with the IP address of the user equipment 20 so that they can be found when matching the value comprised in a reference query message sent by a first user equipment 10. FIG. 8 describes an extension header defined for embedding a data publish message. Such an extension header comprises three main sub-fields:

the IP address of publisher 840,
the data identifier 850,
the metadata for publishing 860.

The data identifier 850 indicates the identifier assigned to the data by the user equipment 20 whose IP address is indicated in the IP address of publisher sub-field 840. The sub-field of metadata for publishing 860 comprises the metadata of the data to be published or recorded in the record table 52.

Field 800 indicates the next header. Field 810 indicates the length of the header. Field 820 indicates the option type. The field of option type 820 indicates the specific type of the extension header in the IPv6 header. The Field 830 indicates the length of the data in option. Field 830 allows facilitating the processing of the extension header. As the length of data in option is given, the router is able to determine the end of the extension header, helping thus the router to correctly extract the data from the extension header.

In an illustrative embodiment according to the invention, the first sharing router 50 may send data records 54 or references on data and/or receive data records 64 or references on data to and from the second sharing router 60 in order to complement their table of records respectively 52 and 62.

In an illustrative embodiment according to the invention, the second sharing router 60 may be a sharing router directly accessible to the user equipments (10, 20) like the first sharing router 50. For example, the first sharing router 50 may be an Access Point (AP) router, for example a Wifi AP router, and the second sharing router may be another AP router, like e.g. another Wifi AP router. In this case, two sets of users may access both the first sharing router 50 and the second sharing router 60. In other words, they would be two first sharing router 50 communicating together.

In an alternative embodiment, several data 22 may be requested in one reference query message and some or all of said several data 22 may further be obtained using the corresponding addresses of the user equipment 20 storing them in one or more reference reply message.

In an embodiment of the invention, the second sharing router 60 may have a larger buffer size and a stronger computation capability as the first sharing router 50. In this case, the second sharing router may be located in the core network level and the first sharing router 50 with fewer capabilities may be located in the access router level. The first sharing router 50 and the second sharing router 60 may co-exist with the traditional routers that only support the routing of network equipments.

In an embodiment of the invention, the first sharing router 50 may store the references and/or the data having larger number of queries.

In an illustrative embodiment of the invention, the first sharing router 50 may calculate the query rate associated with the references stored in the record table 52. Once the query rate reaches or overtakes a pre-defined first threshold for a given reference and if the associated data is not stored in the first sharing router 50, the first sharing router 50 may request to get the associated data from the user equipment 20 storing it, using e.g. a delivery request message. The query rate may be calculated for example as follows:

$$R_{query}(n) = \begin{cases} C(n) & n = 1 \\ \alpha \cdot R_{query}(n-1) + (1-\alpha) \cdot C(n) & n > 1 \end{cases} \quad (1)$$

where $R_{query}(n)$ is the query rate calculated in the $n_{th}$ instance, $C(n)$ the number of queries received in the $n_{th}$ interval, namely, the duration between the $n_{th}$ instance and the $(n+1)_{th}$ instance. The interval can be set as 1 minute or other values. $\alpha$ is a constant between 1 and 0.

In addition to storing the data, the first sharing router 50 may delete some data whose reference(s) has/have fewer queries. The decision of deletion may also be based on the query rate defined in equation (1). As the query rate is and goes below a pre-defined second threshold, the corresponding data is removed or deleted in the first sharing router 50.

Figure 9:
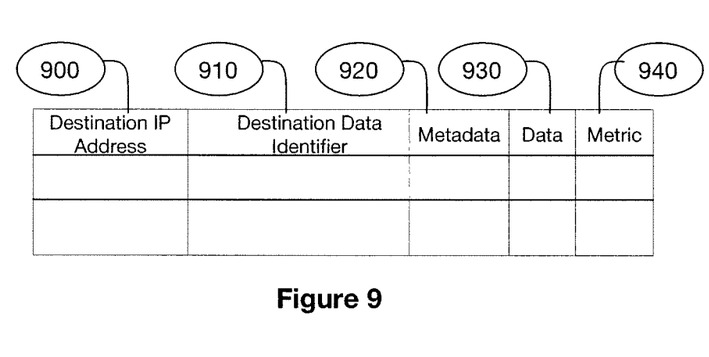
FIG. 9 schematically illustrates a record table according to an embodiment of the present invention.

FIG. 9 describes an illustrative embodiment of record table according to the invention. There may be four options defined in the record table:

the destination IP address 900,
the destination data identifier 910,
the metadata 920,
the data 930,
the metric 940 to the destination.

The destination IP address 900 is the IP address of the user equipment 20 associated with at least a reference of the metadata 920 of the data 930. The destination data identifier 910 allows identifying the data recorded in the record table. The metadata 920 comprises the metadata describing the references or attributes of the associated data. The metric 940 to the destination refers to the distance between the user equipment 20 recording or which has recorded the data and the sharing router storing the associated record (a first sharing router 50 or a second sharing router 60).

In an illustrative embodiment according to the invention, as a lot of references and data are recorded for sharing, some sharing routers may merge some records in their record table. For example, when a record table is found to have more than one entry with the same reference(s) in the metadata, these reference(s) may be merged by the sharing router as one entry with multiple destination IP addresses. For instance, if there are two metadata A and B in the record routing table wherein metadata A is "type=movie" and "name=a", while metadata B is "type=movie" and "name=b". Then the two entries can be merged as a new entry C whose option of metadata (i.e. type of reference) is "type=movie".

Use Case 1: Content Publication from a User Equipment 20

A user equipment 20 creates a media content (i.e. data) and intends to publish it so that the media content may be shared by other user equipments. User equipment 20 firstly sends out the delivery request packet whose sub-field of data remote identifier is set to zero to a first sharing router 50 (e.g. the nearest or known first sharing router 50). If the first sharing router 50 allows the content to be published, the delivery response packet is sent back by the first sharing router 50 to the user equipment 20. After reception by the first sharing router 50 of the media content from user equipment 20, the first sharing router 50 stores the corresponding record in its record table.

Use Case 2: Data Searching Using the Method According to an Embodiment of the Invention A first user equipment 10 sends a reference query message to a sharing router 50 (e.g. the nearest or known first sharing router 50) with the references of "type=movie and name=a". The first sharing router 50 checks the reference comprised in the reference query message and finds that there is no corresponding references in its record table. The first sharing router 50 forwards the reference query message to a second sharing router 60. For example, the first sharing router 50 may know or find that the second sharing router 60 has stored a record comprising "type=movie" in its record table. As the second sharing router receives the query, it finds that two user equipments 20 have the data corresponding to received the reference query message in its routing table. Then, the second sharing router may select the user equipment 20 with the minimum metric and send its address to the first user equipment 10 using a reference reply message.

Use Case 3: Data Storing in the Record Table

A first sharing router 50 finds that some data recorded in its routing table is frequently queried by user equipments. It thus sends out a delivery request message with the sub-field of data remote identifier having the value of the reference recorded in the corresponding record of its record table to a second sharing router 60 that stores the data. After receiving the requested data, the first sharing router 50 creates in its record table a new record corresponding to the received data.

The invention claimed is:

1. A method of sharing data, referred to as data to share, between a plurality of nodes in a communication network, said communication network comprising, at least one collecting node, a first sharing router and a second sharing router, said first sharing router and second sharing router each comprising a memory, said memory comprising a record table for storing at least one record, wherein each record comprises at least a reference describing the data to share and, at least one of the data to share or an address of at least a data node associated with the data to share, said method comprising:

receiving, by the first sharing router, a reference query message comprising a first reference describing first data to share, and an address of a first collecting node bound to be a recipient of the first data to share, determining, by the first sharing router, that the first reference matches with a reference of a first record stored in the record table of the first sharing router, checking if the first data to share associated with said first reference is stored in the memory of the first sharing router and:

when the first sharing router determines that the first data to share is stored in the memory of the first sharing router, sending the first data to share from the first sharing node to the first collecting node, when the first sharing router determines that the first data to share is not stored in the memory of the first sharing router, generating, by the first sharing router, a reference reply message comprising the address of the data node associated with the first data to share, which is stored in the first record of the first record table, the address selected from a plurality of addresses in the first record that were placed in the first record by merging previous records, and then sending the reference reply, by the first sharing router, to the first collecting node, when finding that the first reference does not match any references of the record table, forwarding the reference query message from the first sharing router to the second sharing router.

2. The method according to claim 1, said method further comprising a preliminary act, performed by the first sharing router prior to receiving the reference query message, of receiving from one of the data nodes of the communication network the first record comprising at least the first reference describing the first data to share and, at least one of the first data to share or the address of the data node associated with the first data to share, and storing said first record in the record table of the first sharing router.

3. The method according to claim 1, wherein the reference query message is received from the first collecting node and the reference reply message is sent to the first collecting node.

4. The method according to claim 1, wherein the first collecting node communicates on a direct communication link with the first sharing router and via the first sharing router with the second sharing router.

5. The method according to claim 1, wherein at least one of the first or second sharing router is configured to collect and store in its respective record table second data for which a number of reference query messages, received by the respective first or second sharing router that have respective references describing the second data to share, is above a given value.

6. The method according to claim 1, further comprising the first and second sharing routers exchanging records of their respective record tables.

7. The method according to claim 1, wherein the first reference comprises a type and/or value of the first data to share.

8. The method according to claim 1, wherein the first sharing router is aware of a type of the references that are stored in the record table of the second sharing router.

9. A system for sharing data between a plurality of equipment in a communication network, said system comprising:
a collecting node;
at least one data node;
a second sharing router, said second sharing router comprising a second memory, said second memory comprising a second record table for storing at least one second record, wherein each second record stored in the second record table comprises at least a respective second reference describing respective second data to share and, at least one of the respective second data to share or a respective address of at least a user equipment associated with the respective second data to share, so that the collecting node may further collect the respective second data to share;

a first sharing router, said first sharing router comprising a first memory, said first memory comprising a first record table for storing at least one first record, wherein each first record comprises at least a respective first reference describing respective first data to share and, at least one of the respective first data to share or a respective address of a respective first data node of the at least one data node, which is associated with the respective first data to share, so that the collecting node may further collect the respective first data to share, said first sharing router being configured to:

receive a reference query message comprising a third reference describing third data to share, and an address of the collecting node bound to be a recipient of the third data to share, determine that the third reference matches with one of the respective first references of a respective first record stored in the first record table of the first sharing router, check if the third data to share associated with said third reference is stored in the first memory of the first sharing router and:

when the first sharing router determines that the third data to share is stored in the first memory, sending to the collecting node said third data to share, when the first sharing router determines that the third data to share is not stored in the first memory, generate a reference reply message comprising an address in the first record table of the respective first data node associated with the third data to share, the address selected from a plurality of addresses in the first record table that were placed in the first record table by merging previous records, and send the reference reply message to the collecting node, when finding that the third reference does not match the respective first reference of the at least one first record, forward the reference query message to the second sharing router.

10. A non-transmissible computer-readable medium having computer-executable instructions stored thereon that when executed by a processor configure a first sharing router to perform a method of sharing data, referred to as data to share, between a plurality of nodes in a communication network, said communication network comprising at least one collecting node, the first sharing router and a second sharing router, said first sharing router and second sharing router each comprising a memory, said memory comprising a record table for storing at least one record, wherein each record comprises at least a reference describing the data to share and, at least one of the data to share or an address of at least a data node associated with the data to share, said method comprising:

the first sharing router receiving a reference query message comprising a first reference describing first data to share, and an address of a first collecting node bound to be a recipient of the first data to share, determining, by the first sharing router, that the first reference matches with the reference of a first record stored in the record table of the first sharing router, the computer checking if the first data to share associated with said first reference is stored in the memory of the first sharing router and:

when the first sharing router determines that the first data to share is stored in the memory of the first sharing router, sending said first data to share from the first sharing router to the first collecting node, when the first sharing router determines that the first data to share is not stored in the memory of the first sharing router, generating, by the first sharing router, a reference reply message comprising the address of the data node associated with the first data to share, which is stored in the first record of the first record table, the address selected from a plurality of addresses in the first record that were placed in the first record by merging previous records, and sending the reference reply message to the first collecting node, when finding that the first reference does not match the reference of the first record, forwarding the reference query message from the first sharing router to the second sharing router.

* * * * *